United States Patent
Singh et al.

(10) Patent No.: US 12,236,331 B2
(45) Date of Patent: Feb. 25, 2025

(54) METHOD AND SYSTEM OF DNN MODULARIZATION FOR OPTIMAL LOADING

(71) Applicant: SAMSUNG ELECTRONICS CO., LTD., Suwon-si (KR)

(72) Inventors: Brijraj Singh, Bengaluru (IN); Mayukh Das, Bengaluru (IN); Yash Hemant Jain, Bengaluru (IN); Sharan Kumar Allur, Bengaluru (IN); Venkappa Mala, Bengaluru (IN); Praveen Doreswamy Naidu, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 868 days.

(21) Appl. No.: 17/430,644

(22) PCT Filed: Jul. 9, 2021

(86) PCT No.: PCT/KR2021/008776
§ 371 (c)(1),
(2) Date: Aug. 12, 2021

(87) PCT Pub. No.: WO2022/035058
PCT Pub. Date: Feb. 17, 2022

(65) Prior Publication Data
US 2023/0153565 A1      May 18, 2023

(30) Foreign Application Priority Data

Aug. 13, 2020   (IN) .............................. 202041034900
Mar. 1, 2021    (IN) .............................. 202041034900

(51) Int. Cl.
*G06N 3/04*     (2023.01)
*G06N 3/092*    (2023.01)

(52) U.S. Cl.
CPC ............... *G06N 3/04* (2013.01); *G06N 3/092* (2023.01)

(58) Field of Classification Search
CPC ................................ G06N 3/04; G06N 3/092
See application file for complete search history.

(56) References Cited

U.S. PATENT DOCUMENTS 4,947,482 A *   8/1990   Brown ................... G06N 3/065
                                                 708/801
10,671,916 B1 * 6/2020   Sundararaman ....... G06N 3/045
(Continued)

FOREIGN PATENT DOCUMENTS

CN      107480774 A  * 12/2017
CN      109919315 A  *  6/2019
(Continued)

OTHER PUBLICATIONS

Viebke, André, et al. "CHAOS: a parallelization scheme for training convolutional neural networks on Intel Xeon Phi." The Journal of Supercomputing 75.1 (2019): 197-227 (Year: 2019).*
(Continued)

*Primary Examiner* — Shahid K Khan
(74) *Attorney, Agent, or Firm* — Sughrue Mion, PLLC

(57) ABSTRACT

A method of deep neural network (DNN) modularization for optimal loading includes receiving, by an electronic device, a DNN model for execution, obtaining, by the electronic device, a plurality of parameters associated with the electronic device and a plurality of parameters associated with the DNN model, determining, by the electronic device, a number of sub-models of the DNN model and a splitting index, based on the obtained plurality of parameters associated with the electronic device and the obtained plurality of parameters associated with the DNN model, and splitting, by the electronic device, the received DNN model into a plurality of sub-models, based on the determined number of (Continued)

sub-models of the DNN model and the determined splitting index.

17 Claims, 10 Drawing Sheets

(56) References Cited

U.S. PATENT DOCUMENTS

| | | | |
|---|---|---|---|
| 10,950,132 B2 | 3/2021 | Tong et al. | |
| 11,928,583 B2 * | 3/2024 | Turgeman | G06N 3/08 |
| 2018/0144265 A1 | 5/2018 | Bonawitz et al. | |
| 2018/0260531 A1 | 9/2018 | Nori et al. | |
| 2018/0293498 A1* | 10/2018 | Campos | G06F 9/451 |
| 2019/0286973 A1* | 9/2019 | Kovvuri | G06N 3/04 |
| 2019/0362235 A1* | 11/2019 | Xu | G06T 17/00 |
| 2019/0370659 A1 | 12/2019 | Dean et al. | |
| 2019/0392307 A1 | 12/2019 | Liao et al. | |
| 2020/0125586 A1 | 4/2020 | Rezaeian et al. | |

FOREIGN PATENT DOCUMENTS

| | | | | |
|---|---|---|---|---|
| CN | 111783954 A | * | 10/2020 | ......... G06F 15/7817 |
| EP | 3226175 A1 | * | 10/2017 | ......... G06K 9/00744 |
| KR | 10-2018-0084969 A | | 7/2018 | |
| KR | 20180109619 A | * | 10/2018 | |
| RU | 2595066 C1 | * | 8/2016 | |
| SG | 10201609584V A | * | 7/2017 | |
| WO | 2015/003436 A1 | | 1/2015 | |
| WO | WO-2019095873 A1 | * | 5/2019 | ............... G06F 9/38 |
| WO | 2020/122985 A1 | | 6/2020 | |

OTHER PUBLICATIONS

International Search Report (PCT/ISA/210) issued Oct. 22, 2021 by the International Searching Authority for International Application No. PCT/KR2021/008776.
Written Opinion (PCT/ISA/237) issued Oct. 22, 2021 by the International Searching Authority for International Application No. PCT/KR2021/008776.
Communication issued May 5, 2022 by the Indian Patent Office for Indian Patent Application No. 202041034900.

* cited by examiner

METHOD AND SYSTEM OF DNN MODULARIZATION FOR OPTIMAL LOADING

TECHNICAL FIELD

The disclosure relates to Deep Neural Network (DNN) deployment in a device, and more specifically, relates to a method and a system of DNN modularization for optimal loading.

BACKGROUND ART

Nowadays, for running any application on a mobile device, mostly neural networks are used, especially a Deep Neural Network (DNN). This DNN has multiple layers between the input and the output. The multiple layers of the DNN model are to be loaded and executed for successful working of the application in the electronic device.

Conventional arts disclose sequential loading and execution of the multiple layers of the DNN model. However, as there is a plurality of layers in the DNN model, the time for loading the DNN model is more. Further execution time of the DNN model is more. Thus there is a delay in execution of the DNN model causing latency.

Further, this results in over utilisation of the hardware units of the electronic device. For example, the memory used for loading the DNN model is occupied for a longer time, which may cause inefficient operation of other applications running on the electronic device. Similarly, the battery is also over used. Further, the processor of the electronic device is operating for longer.

The conventional art does not provide any solution for the above mentioned technical and hardware disadvantages. Thus, there may be a need for providing a method and system that ensure fast loading and execution of the DNN model with efficient utilisation of the hardware units of the electronic device.

DISCLOSURE

Technical Problem

Provided is a method and a system for efficient loading and execution of a DNN model and reducing a time for loading the DNN model.

Additional aspects will be set forth in part in the description that follows and, in part, will be apparent from the description, or may be learned by practice of presented embodiments.

Technical Solution

In accordance with an aspect of the disclosure, a method of deep neural network (DNN) modularization for optimal loading includes receiving, by an electronic device, a DNN model for execution, obtaining, by the electronic device, a plurality of parameters associated with the electronic device and a plurality of parameters associated with the DNN model, determining, by the electronic device, a number of sub-models of the DNN model and a splitting index, based on the obtained plurality of parameters associated with the electronic device and the obtained plurality of parameters associated with the DNN model, and splitting, by the electronic device, the received DNN model into a plurality of sub-models, based on the determined number of sub-models of the DNN model and the determined splitting index. The method further includes determining, by the electronic device, a performance level of each of the plurality of sub-models into which the DNN model is split, by executing each of the plurality of sub-models on a testing device, wherein a capability of the testing device is same as a capability of the electronic device, determining, by the electronic device, whether the determined performance level of each of the plurality of sub-models meets a performance threshold, and based on the performance level of at least one among the plurality of sub-models being determined to meet the performance threshold, selecting, by the electronic device, the at least one among the plurality of sub-models for execution.

The number of sub-models may be a number of the DNN model that is split, and the splitting index may indicate a sequence of the plurality of sub-models of the DNN model.

The plurality of parameters associated with the electronic device may include a number of tasks to be executed at the electronic device, a type of task to be executed at the electronic device, a number of hardware threads available at the electronic device for the DNN model, and a memory size of the electronic device.

The determining the performance level of each of the plurality of sub-models may include deploying, by the electronic device, each of the plurality of sub-models on the testing device, determining, by the electronic device, a loading time of each of the plurality of sub-models deployed on the testing device, and determining, by the electronic device, the performance level of each of the plurality of sub-models, based on the determined loading time of each of the plurality of sub-models.

The method may further include detecting, by the electronic device, at least one main task of an application that is executed in the electronic device, identifying, by the electronic device, a plurality of sub-tasks to be executed to complete the detected at least one main task, allocating, by the electronic device, the plurality of sub-models to be loaded for executing the identified plurality of sub-tasks, and loading, by the electronic device, the allocated plurality of sub-models in parallel to executing the plurality of sub-tasks.

The allocating the plurality of sub-models to be loaded for executing the identified plurality of sub-tasks may include identifying, by the electronic device, the plurality of sub-models to be loaded for executing the identified plurality of sub-tasks, based on the application, determining, by the electronic device, an order of execution of the plurality of sub-tasks and associated inter-dependencies, based on an instant execution state of the application, and allocating, by the electronic device, the identified plurality of sub-models to be loaded for executing the plurality of sub-tasks, based on the determined order of execution and the determined associated inter-dependencies.

The method may further include grouping, by the electronic device, one or more sub-models among the plurality of sub-models to be loaded for executing the plurality of sub-tasks, based on the determined order of execution and the determined associated inter-dependencies.

The loading the allocated plurality of sub-models may include determining, by the electronic device, whether a number of hardware threads available at the electronic device is equal to the allocated plurality of sub-models to be loaded for executing the plurality of sub-tasks, based on the number of hardware threads being determined to be less than the allocated plurality of sub-models to be loaded for executing the plurality of sub-tasks, selecting, by the electronic device, a first set of sub-models, among the allocated plurality of sub-models, for executing a first set of sub-tasks, among the plurality of sub-tasks to be executed, allocating, by the electronic device, the selected first set of sub-models, adding, by the electronic device, remaining sub-models, among the plurality of sub-models, into a waiting list, and loading, by the electronic device, the allocated first set of sub-models in parallel to executing the first set of sub-tasks.

The method may further include executing, by the electronic device, the first set of sub-tasks in parallel to the loading the allocated first set of sub-models, allocating, by the electronic device, the remaining sub-models to be loaded for executing a remaining set of sub-tasks, among the plurality of sub-tasks, from the waiting list, while the first set of sub-tasks are being executed, loading, by the electronic device, the allocated remaining sub-models in parallel to executing the remaining set of sub-tasks, while the first set of sub-tasks are being executed, and executing, by the electronic device, the remaining sub-tasks in parallel to the loading the allocated remaining sub-models.

In accordance with an aspect of the disclosure, an electronic device for Deep Neural Network (DNN) modularization for optimal loading, the electronic device in communication with a testing device, includes a memory storing instructions, a processor, and a communication interface. The processor is configured to execute the stored instructions to receive a DNN model for execution, obtain a plurality of parameters associated with the electronic device and a plurality of parameters associated with the DNN model, determine a number of sub-models of the DNN model and a splitting index, based on the obtained plurality of parameters associated with the electronic device and the obtained plurality of parameters associated with the DNN model, and split the received DNN model into a plurality of sub-models, based on the determined number of sub-models of the DNN model and the determined splitting index. The processor is further configured to execute the stored instructions to determine a performance level of each of the plurality of sub-models into which the DNN model is split, by executing each of the plurality of sub-models on the testing device, wherein a capability of the testing device is same as a capability of the electronic device, determine whether the determined performance level of each of the plurality of sub-models meets a performance threshold, and based on the performance level of at least one among the plurality of sub-models being determined to meet the performance threshold, select the at least one among the plurality of sub-models for execution.

The number of sub-models may be a number of the DNN model that is split, and the splitting index indicates a sequence of the plurality of sub-models of the DNN model.

The plurality of parameters associated with the electronic device may include a number of tasks to be executed at the electronic device, a type of task to be executed at the electronic device, a number of hardware threads available at the electronic device for the DNN model, and a memory size of the electronic device.

The processor may be further configured to execute the stored instructions to deploying each of the plurality of sub-models on the testing device, determining a loading time of each of the plurality of sub-models deployed on the testing device, and determining the performance level of each of the plurality of sub-models, based on the determined loading time of each of the plurality of sub-models.

The processor may be further configured to execute the stored instructions to detect at least one main task of an application that is executed in the electronic device, identify a plurality of sub-tasks to be executed to complete the detected at least one main task, allocate the plurality of sub-models to be loaded for executing the identified plurality of sub-tasks, and load the allocated plurality of sub-models in parallel to executing the plurality of sub-tasks.

In accordance with an aspect of the disclosure, a method of loading an artificial intelligence (AI) driven neural model in an electronic device includes identifying, by the electronic device, at least one main task of an application that is executed on the electronic device, identifying, by the electronic device, a plurality of individual sub-tasks to be executed for completing the identified at least one main task, identifying, by the electronic device, a parent AI model to be deployed for performing the identified at least one main task, identifying, by the electronic device, a plurality of child AI models to be deployed for performing the identified plurality of individual sub-tasks, determining, by the electronic device, using a pre-trained AI model, one or more of the identified plurality of child AI models to be executed in parallel for completing the identified plurality of individual sub-tasks, and loading, by the electronic device, the determined one or more of the plurality of child AI models in parallel to execution of the identified at least one main task.

The method may further include determining, by the electronic device, an order of execution of the identified plurality of sub-tasks. The determining the one or more of the identified plurality of child AI models may include determining, by the electronic device, using the pre-trained AI model, the one or more of the identified plurality of child AI models to be executed in parallel for completing the identified plurality of individual sub-tasks, based on the determined order of execution of the identified plurality of sub-tasks.

The method may further include determining, by the electronic device, whether a number of hardware threads available for loading the determined one or more of the plurality of child AI models is equal to a number of the determined one or more of the plurality of child AI models. The loading the determined one or more of the plurality of child AI models may include, based on the number of hardware threads available for loading the determined one or more of the plurality of child AI models being determined to be equal to the number of the determined one or more of the plurality of child AI models, loading, by the electronic device, the determined one or more of the plurality of child AI models on the hardware threads, in parallel to the execution of the identified at least one main task.

The method may further include, based on the number of hardware threads available for loading the determined one or more of the plurality of child AI models being determined to not be equal to the number of the determined one or more of the plurality of child AI models, selecting, by the electronic device, a set of the plurality of child AI models to be executed in parallel for completing the identified plurality of individual sub-tasks, based on the number of the number of hardware threads. The loading the determined one or more of the plurality of child AI models may include loading, by the electronic device, the selected set of the plurality of child AI models on the hardware threads, in parallel to the execution of the identified at least one main task. The method may further include adding, by the electronic device, remaining ones of the plurality of child AI models without the selected set of the plurality of child AI models, to a waiting list to be loaded and executed.

A non-transitory computer-readable medium may store instructions that, when executed by at least one processor, cause the at least one processor to perform the method.

A non-transitory computer-readable medium may store instructions that, when executed by at least one processor, cause the at least one processor to perform the method.

DESCRIPTION OF DRAWINGS

The above and other aspects, features, and advantages of embodiments of the disclosure will be more apparent from the following description taken in conjunction with the accompanying drawings, in which.

BEST MODE

Figure 1:
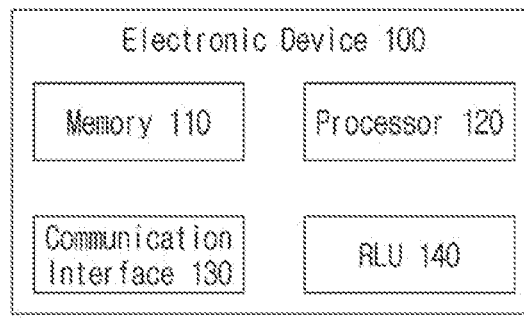
FIG. 1 illustrates a block diagram of an electronic device for DNN modularization for optimal loading, according to an embodiment as disclosed herein.

An object of embodiments herein is to split the DNN model into a plurality of blocks to be executed on an electronic device for parallel loading and execution of the sub-models for reducing latency.

Another object of the embodiments herein is to evaluate a performance of the DNN model providing an improved value of the sub-models.

Another object of the embodiments herein is to execute a first set of blocks in parallel to loading a second set of blocks on the electronic device to ensure reduced latency and efficient hardware utilization.

The embodiments herein and the various features and advantageous details thereof are explained more fully with reference to the non-limiting embodiments that are illustrated in the accompanying drawings and detailed in the following description. Descriptions of well-known components and processing techniques may be omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended to facilitate an understanding of ways in which the embodiments herein can be practiced and to further enable those skilled in the art to practice the embodiments herein. Accordingly, the examples may not be construed as limiting the scope of the embodiments herein.

As is traditional in the field, embodiments may be described and illustrated in terms of blocks that carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it may be understood that the embodiments presented herein are not limited by the accompanying drawings. As such, the disclosure may be construed to extend to any alterations, equivalents and substitutes in addition to those that are set out in the accompanying drawings. Although the terms first, second, etc. may be used herein to describe various elements, these elements may not be limited by these terms. These terms are only used to distinguish one element from another.

Accordingly, the embodiments herein provide a method for modularization of a DNN model for optimal loading on a vendor's device. The modularization of the DNN model is performed by a developer's device.

The modularization is such that the loading and execution of the DNN model becomes faster, thereby reducing latency while loading. The modularization of the DNN model by the developer's device is mainly performed by a reinforcement learning unit (RLU). The developer's device obtains parameters associated with the vendor's device and the DNN model. Once the parameters are received, the RLU unit splits the DNN model into a plurality of sub-models based on the parameters associated with the vendor's device and the DNN model. The developer's device then determines a performance level of each of the sub-models by executing each of the sub-models on the developer's device. The capability of the developer's device is same as a capability of the vendor's device. Further the developer's device determines whether the performance level meets a threshold performance. The plurality of sub-models of the DNN model is sent to the vendor's device for loading and execution.

Unlike existing methods and systems, the method and developer's device splits the DNN model in a way that enables parallel execution and loading of the sub-blocks of the DNN model. The sub-models are loaded and executed optimally even when a number of hardware threads available at the vendor's device is less than the number of sub-model of the DNN model. The above mentioned technical advantage also ensures efficient hardware utilization.

By reducing the loading and execution time of the DNN model by splitting it into sub-models, the amount of time for which the memory is used is reduced. This provides efficient execution and operation of other application running on the vendor's device because memory is available as and when required. Further, because the execution and loading time is less, the operation of the processor of the electronic device is reduced, and hence battery life is improved. Thus, the method for DNN modularization not only reduces the latency but also ensures efficient utilization of the hardware units of the vendor's device.

Referring now to FIGS. 1A through 6b, similar reference characters denote corresponding features consistently throughout the figures.

FIG. 1 illustrates a block diagram of an electronic device (100) for modularization of a DNN model, according to an embodiment as disclosed herein. The electronic device (100) may be, for example, but not limited, to social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device including DNN execution capability or the like. The electronic device (100) is responsible for modularizing the DNN Model received from an electronic device 100. The DNN model may be for example but not limited to inception-V3, mobilenet-V1, mobile net-V2 or a custom model and the like.

The electronic device (100) indicated in FIG. 1 acts as a developer's device and also a vendor's device. In an embodiment, the DNN model is modularized by the electronic device (100) and is executed. The DNN model is executed for performing a task or a plurality of tasks on the electronic device (100). The tasks may be for example but not limited to object detection, classification, recognition, segmentation and the like.

In an embodiment, the electronic device (100) includes a memory (110), a processor (120), a communication interface (130), and a RLU (140).

In an embodiment, the memory (110) is configured to store the received DNN model and a plurality of sub-models of the DNN models generated by the electronic device (100). The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" may not be interpreted that the memory (110) is non-movable. In some examples, the memory (110) can be configured to store larger amounts of information than the memory. In examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

In an embodiment, the processor (120) communicates with the memory (110), the communication interface (130), and the RLU (140). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communication interface (130) is configured for communicating internally between internal hardware components and with external devices via one or more networks. The communication interface (130) includes an electronic circuit for a standard that enables wired or wireless communication.

In an embodiment, the RLU (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The RLU (140) is the reinforcement learning unit and is a customized Machine Learning (ML) model for modularizing the DNN model.

In an embodiment, the RLU (140) is configured to receive the DNN model from the electronic device (100). The RLU (140) further obtains parameters associated with the DNN model and the electronic device (100). The parameters associated with the DNN model includes a number of layers of the DNN model, information about the layers and loading time of each layer individually and collective time of loading all the layers. The parameters associated with the electronic device (100) includes a number of tasks to be executed at the electronic device (100), a type of task to be executed at the electronic device (100), a number of hardware threads available at the electronic device (100) for execution of the DNN model, and a memory size of the electronic device (100).

In an embodiment, the DNN model is responsible for performing the task by executing the DNN model in the electronic device (100).

The RLU (140) then determines a number (k) indicating the number of sub-models in which the DNN model may need to be divided and a splitting index ($\vec{P}$) indicating a sequence of the sub-models of the DNN model based on the parameters associated with the electronic device (100).

The DNN model is split into a plurality of sub-models based on the number (k), and the sub-models are arranged in a sequence based on the splitting index ($\vec{P}$). In an embodiment, the plurality of sub-models arranged are loaded and executed on a testing device. The testing device has same capability as that of the electronic device (100). The capability of the testing device refers to the number of hardware devices available at the testing device and the like.

Further, the RLU (140) determines a performance of the sub-models and checks whether the determined performance meets a performance threshold. If the determined performance meets the performance threshold, then the plurality of sub-models and the splitting index ($\vec{P}$) is finalized by the electronic device (100) for loading and execution. The sub-models are responsible for performing the tasks on the electronic device (100).

In another embodiment, if the performance threshold is not met, then the number (k) and the splitting index ($\vec{P}$) is sent as a feedback to the RLU (140) for further optimization and learning.

Once the optimized value of (k) and the splitting index is finalized, the RLU (140) splits the DNN model for further loading and execution.

In an embodiment, the processor (120) of the electronic device (100) is configured for detecting the main task of the application that is to be executed in the electronic device (100). The processor (120) then identifies a plurality of sub-tasks to be executed to complete the main task. After identifying the plurality of sub-tasks, the processor (120) identifies a plurality of sub-models to perform the sub-tasks based the application.

After identifying the plurality of sub-models, the processor (120) determines an order of execution of the plurality of sub-tasks and also determines associated inter-dependencies based on an instant execution state of the application.

The processor (120) allocates the plurality of sub-models of the DNN model to be loaded for executing the plurality of sub-tasks based on the order of execution and associated inter-dependencies. In an embodiment, the one or more sub-models from the plurality of sub-models are grouped for executing the plurality of sub-tasks based on the order of execution and associated inter-dependencies.

In an embodiment, once the plurality of sub-models are allocated, the processor (120) determines whether the number of available hardware threads are equal to the plurality of sub-models. The hardware threads are physical components of the electronic device (100) that perform the transferring data from an auxiliary memory to main memory (or GPU/NPU/DSP) of the electronic device (100) or vice versa.

In an embodiment, the plurality of sub-models are loaded in parallel on all the hardware threads in response to determining that the number of sub-models is equal to the available hardware threads. After loading all, the sub-models are executed in parallel, thereby saving execution and loading time.

In another embodiment, if the number of sub-models is more than the number of hardware threads available then the processor (120) selects a first set of sub-models from the plurality of sub-models to execute a first set of sub-tasks from the plurality of tasks equal to the number of hardware threads available. The processor (120) at time T1 loads each model from the first set of the sub-models on a different thread from the available hardware threads. The remaining sub-models are sent in a waiting list. At time T2, the first set of sub-models that were loaded at T1 are executed, and simultaneously the remaining sub-models are loaded on the hardware threads.

Thus as seen above, the claimed method in one case provides parallel execution of all the sub-models if the number of sub-models is equal to the number of hardware threads available. In another case when the number of hardware threads available are less than the number of sub-models, then the claimed method provides parallel execution and loading of the sub-models.

Although the FIG. 1 shows various hardware components of the electronic device 100, it is to be understood that other embodiments are not limited thereon. In other embodiments, the electronic device 100 may include less or more number of components. Further, the labels or names of the components are used only for illustrative purpose and does not limit the scope of the embodiments. One or more components can be combined together to perform same or substantially similar function to modularize the DNN Model by the electronic device (100).

Figure 2:
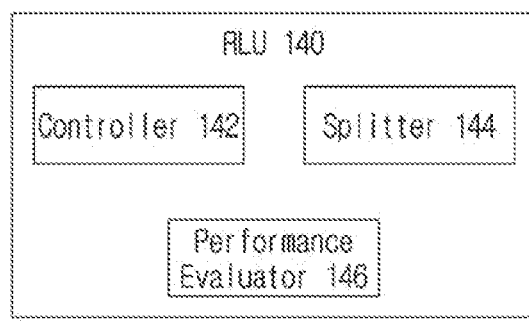
FIG. 2 illustrates a block diagram of a RLU for DNN modularization for optimal loading, according to an embodiment as disclosed herein.

FIG. 2 illustrates a block diagram of the RLU (140) for DNN modularization for optimal loading, according to an embodiment as disclosed herein.

In an embodiment, the RLU (140) includes, a controller (142), a splitter (144), and a performance evaluator (146).

In an embodiment, the controller (142) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the controller (142) receives the DNN model, the parameters associated with the DNN model and the parameters associated with the electronic device (100) as an input. Further, the controller (142) determines the number (K) that is the total number of splits to be made to the DNN model for generating the plurality of sub-models and their corresponding position in a sequence.

In an embodiment, the number K and the splitting index are decided by considering two promising cases: (a) when a number of sub-models (k) and a number of available h/w threads are the same and (b) when a number of child models are more than the number of available h/w threads.

The output of the controller (K and splitting index ($\vec{P}$) are fed as an input to the splitter (144). The splitter (144) splits the DNN model received by the controller (142) into the plurality of sub-models based on the split number (k). The splitter (144) also arranges the plurality of sub-models into a sequence based on the splitting index ($\vec{P}$).

In an embodiment, the splitter (144) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the performance evaluator (146) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The performance evaluator (146) loads and executes the plurality of sub-models arranged into the sequence based on the splitting index ($\vec{P}$) and evaluates the performance of each of the sub-models. The performance evaluator (146) evaluates a loading time of all the sub-models. Based on the loading time, the performance evaluator (146) determines a reward for the plurality of models. The reward is calculated by Equation 1. In Equation 1, T is a total loading time of the DNN model, Csplit is the total number of splits and ε is to cover the variance in the loading time of each sub-model.

$$\text{Reward} = \begin{cases} 0, & \text{If } \tau = \dfrac{T}{C_{split}} \pm \varepsilon \\ -1, & \text{otherwise} \end{cases} \quad \text{Equation 1}$$

The reward is a feedback that is sent to the controller 142 for modifying the value of k and the splitting index. In an embodiment, the performance evaluator compares the reward with the performance threshold and sends the feedback to the controller (142). This process is repeated for a number of iterations, and the controller keeps on improving the values of the k and the splitting index.

The final values of the (K) and the splitting index are sent to the electronic device (100) for execution of the DNN model by breaking the DNN model into k sub-models and arranging them into the sequence based on the splitting index ($\vec{P}$).

By splitting the DNN model, the loading time and the execution time of the DNN model are reduced, thereby reducing latency.

The above described any one or any combination of the plurality of modules/components may be implemented through an artificial intelligence (AI) model. A function associated with AI may be performed through memory (110) and the processor (120). The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2 shows various hardware components of the RLU (140), it is to be understood that other embodiments are not limited thereon. In other embodiments, the RLU (140) may include a less or more number of components. Further, the labels or names of the components are used only for illustrative purposes and do not limit the scope of the embodiments. One or more components can be combined together to perform same or substantially similar functions to modularize the DNN model.

Figure 3:
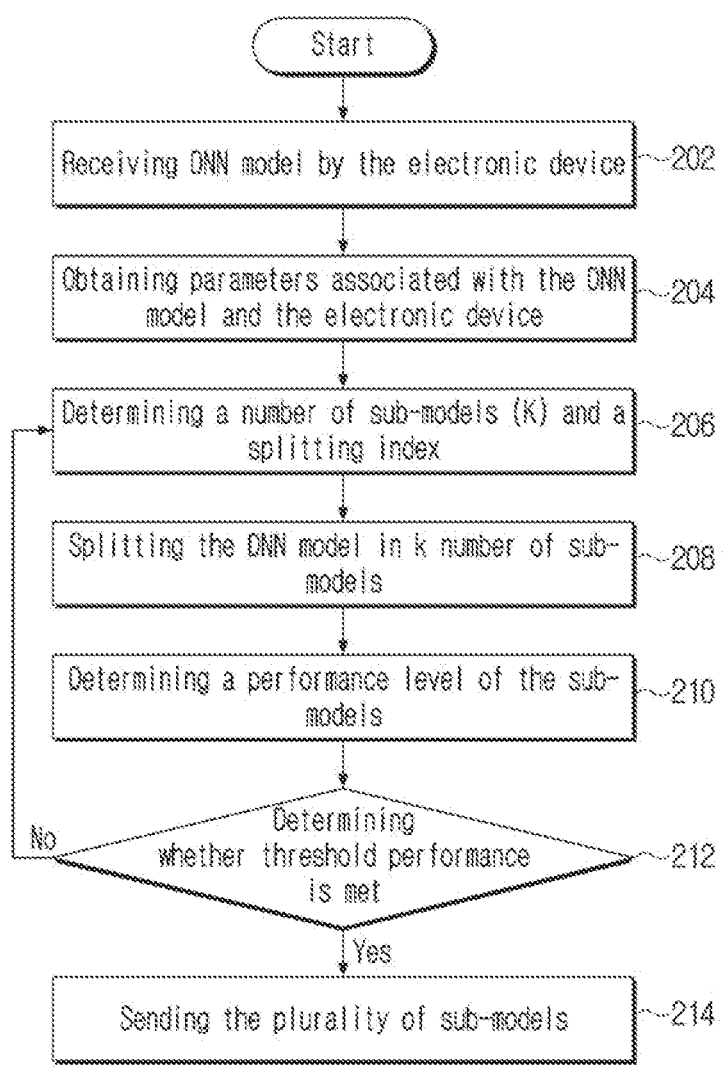
FIG. 3 is a flow diagram illustrating a method for DNN modularization for optimal loading from an electronic device perspective, according to an embodiment as disclosed herein.

FIG. 3 is a flow diagram, illustrating a method (200) for DNN modularization for optimal loading from an electronic device perspective, according to an embodiment as disclosed herein.

At operation (202), the method (200) includes receiving by the electronic device (100), the DNN model for execution.

At operation (204), the method (200) includes obtaining by the electronic device (100) device the plurality of parameters associated with the electronic device (100) and the plurality of parameters associated with the DNN model. In an embodiment, the plurality of parameters associated with the electronic device (100) includes a number of tasks to be executed at the electronic device (100), a type of task to be executed at the electronic device (100), a number of hardware threads available at the electronic device (100), an execution of the DNN model, and a memory size of the electronic device 100. The plurality of parameters associated with the DNN model includes the different layers of the DNN model, information about the different layers and a loading time of each layer individually and a collective time of loading all the layers.

At operation (206), the method (200) includes determining the number k and the splitting index based on the plurality of parameters associated with the DNN model and the plurality of parameters associated with the electronic device (100).

At operation (208), the method (200) includes splitting the DNN model into the plurality of sub-models based on the number k and arranging the plurality of sub-models in sequence based on the splitting index.

At operation (210), the method (200) includes determining, by the electronic device (100), the performance level of each of the sub-models by executing each of the sub-models on the testing device. A capability of the testing device is the same as a capability of the electronic device (100).

At operation (212), the method (200) includes determining, by the electronic device (100), whether the performance level meets a performance threshold. In an embodiment, the electronic device deploys each of the sub-models on the testing device. Further, the electronic device (100) determines the loading time of each of the sub-models of the DNN model loaded at the testing device. Further, the electronic device (100) determines the performance level of each of the sub-models based on the loading time of each of the sub-models of the DNN model. The method (200) (200) proceeds to (214) in response to determining that the performance level meets the threshold criteria. Otherwise, the method (200) returns to operation (206).

At operation (214), the method (200) includes sending by the electronic device (100) the plurality of sub-models of the DNN model for execution in response to determining that the performance level meets the performance threshold. The method (200) may further include sending the determined value of k and the splitting index back at RLU at operation 206 for improving the values to meet the performance threshold.

The various actions, acts, blocks, steps, or the like in the method (200) may be performed in the order presented, in a different order or simultaneously. Further, in some embodiments, some of the actions, acts, blocks, steps, or the like may be omitted, added, modified, skipped, or the like without departing from the scope of the embodiments.

Figure 4:
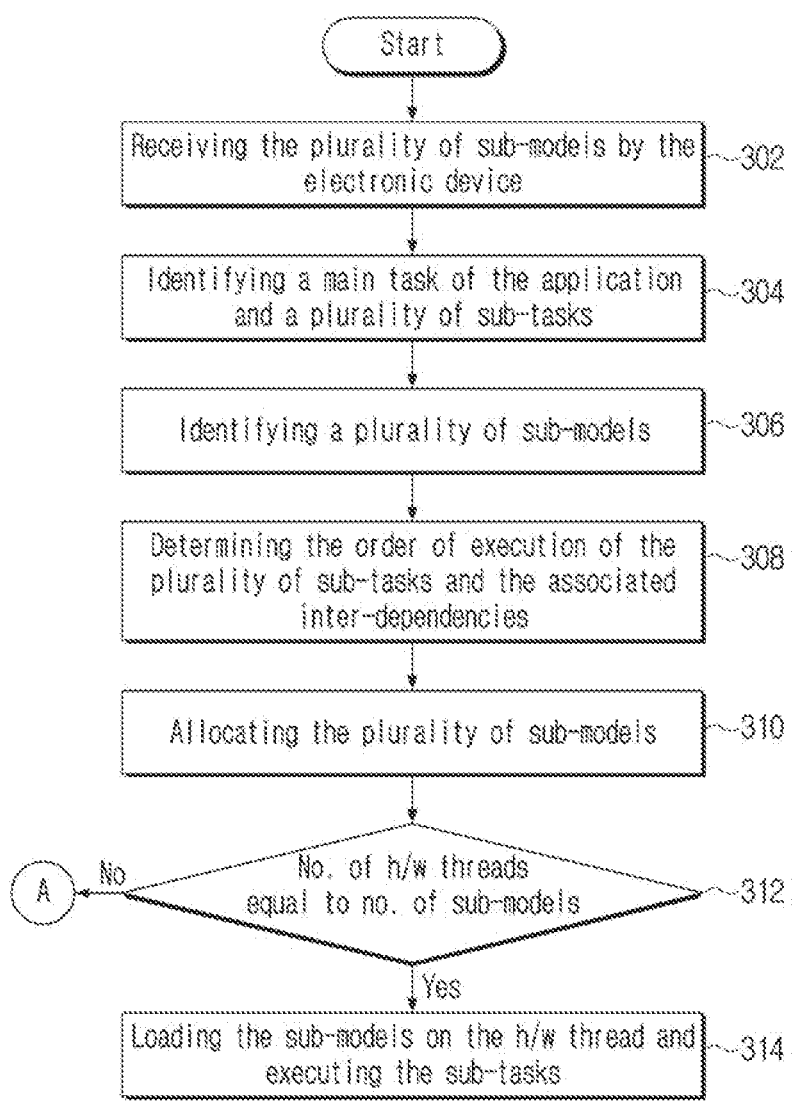
FIG. 4 is a part of a flow diagram illustrating a method for DNN modularization for optimal loading from an electronic device perspective, according to an embodiment as disclosed herein.
Figure 5:
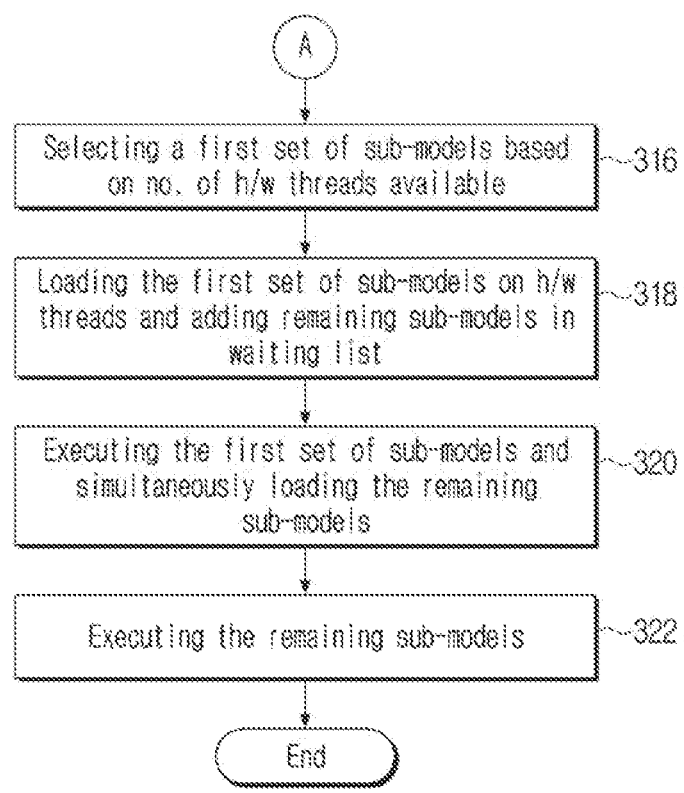
FIG. 5 is another part of a flow diagram illustrating a method for DNN modularization for optimal loading from an electronic device perspective, according to an embodiment as disclosed herein.

FIG. 4 is a part of a flow diagram illustrating a method (300) for DNN modularization for optimal loading from an electronic device perspective, according to an embodiment as disclosed herein. FIG. 5 is another part of a flow diagram illustrating the method (300) for DNN modularization for optimal loading from an electronic device perspective, according to an embodiment as disclosed herein.

At operation (302), the RLU (140) receives and finalizes the plurality of sub-models for execution of the task on the electronic device (100).

At operation (304), the processor (120) of the electronic device 100 identifies and detects the main task of the application that is to be executed and identifies the plurality of sub-tasks to be executed for performing the main task at the electronic device (100).

At operation (306), the method (300) includes identifying by the processor (120) of the electronic device (100) the plurality of sub-models to execute the plurality of sub-tasks. The processor (120) identifies the plurality of sub-models based on the application and the sub-tasks.

At operation (308), the method (300) includes determining by the processor (120) the order of execution of the plurality of sub-tasks and the associated inter-dependencies based on the instant execution state of the application.

At operation (310), the method (300) includes allocating by the processor (120) the plurality of sub-models to be loaded for executing the plurality of sub-tasks based on the order of execution and associated inter-dependencies. In an embodiment, the one or more sub-models of the plurality of sub-models may be grouped together and then allocated to the sub-tasks.

At operation (312), the method (300) includes determining by the processor (120) whether the number of the hardware threads available for loading the plurality of sub-models is equal to the number of plurality of sub-models to be loaded for executing the plurality of sub-tasks.

The method (300), proceeds to operation (314) if the number of the hardware threads available for loading the plurality of sub-models is equal to the plurality of sub-models to be loaded for executing the plurality of sub-tasks. The method (300) proceeds to operation (316) if number of the hardware threads available for loading the plurality of sub-models is less than the plurality of sub-models to be loaded for executing the plurality of sub-tasks.

At operation (314), the method (300) includes loading all the sub-models of the plurality of sub-models on the available hardware threads and executing all the sub-tasks in parallel. Thus breaking the DNN model into plurality of sub-models and loading the sub-models takes less time and further execution of the sub-models in parallel also reduces the time taken. The method (300) is stopped here.

At operation (316), the method (300) includes selecting by the processor (120) of the electronic device (100), the first set of sub-models from the plurality of sub-models to execute the first set of sub-tasks from the plurality of tasks to be executed. The first set of sub-models is chosen such that the number of sub-models in the first set is equal to the available hardware threads for loading.

At operation (318), the first set of sub-models are allocated to the first set of sub-task and the sub-models of the first are loaded on the available hardware threads. Simultaneously at operation (318), the remaining sub-task are allotted remaining sub-models and the remaining sub-models are loaded are added into the waiting list. The waiting list includes the sub-models that are to be loaded and executed next.

At operation (320), the first set of sub-models that were loaded at operation (318) are executed, the remaining sub-models are allocated to the remaining sub-task of the main task and the remaining sub-models are loaded simultaneously for execution.

At operation (322), the remaining sub-models that were loaded at operation (320) are executed in parallel over the different hardware threads.

Figure 6:
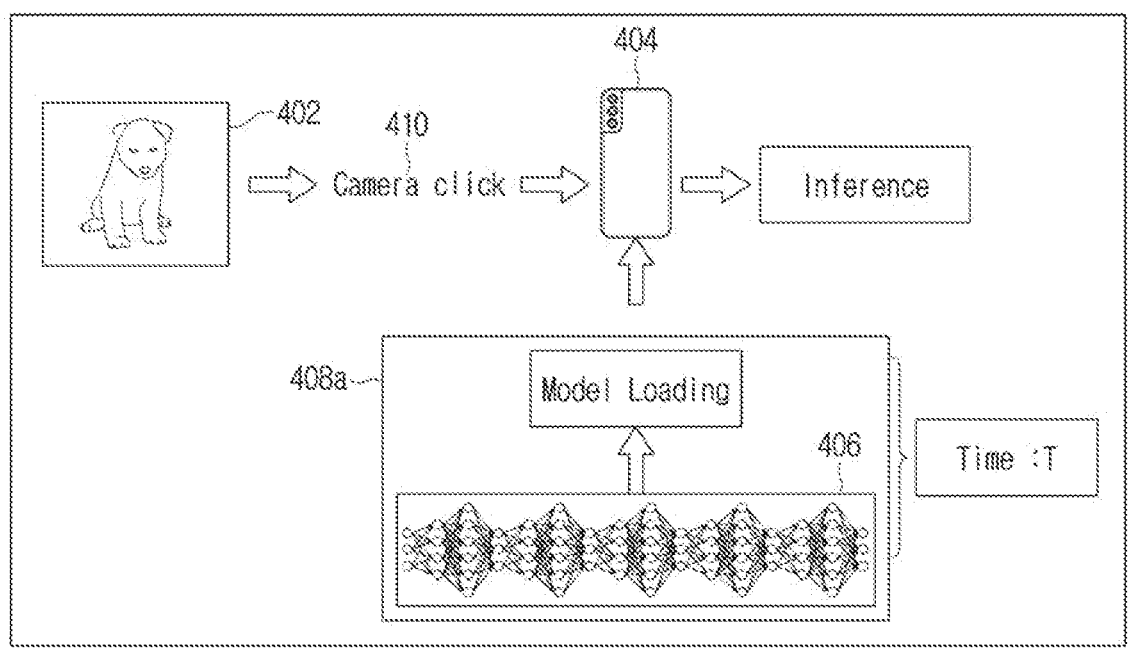
FIG. 6 is a schematic diagram illustrating an example scenario of loading a DNN, according to a prior art.
Figure 7:
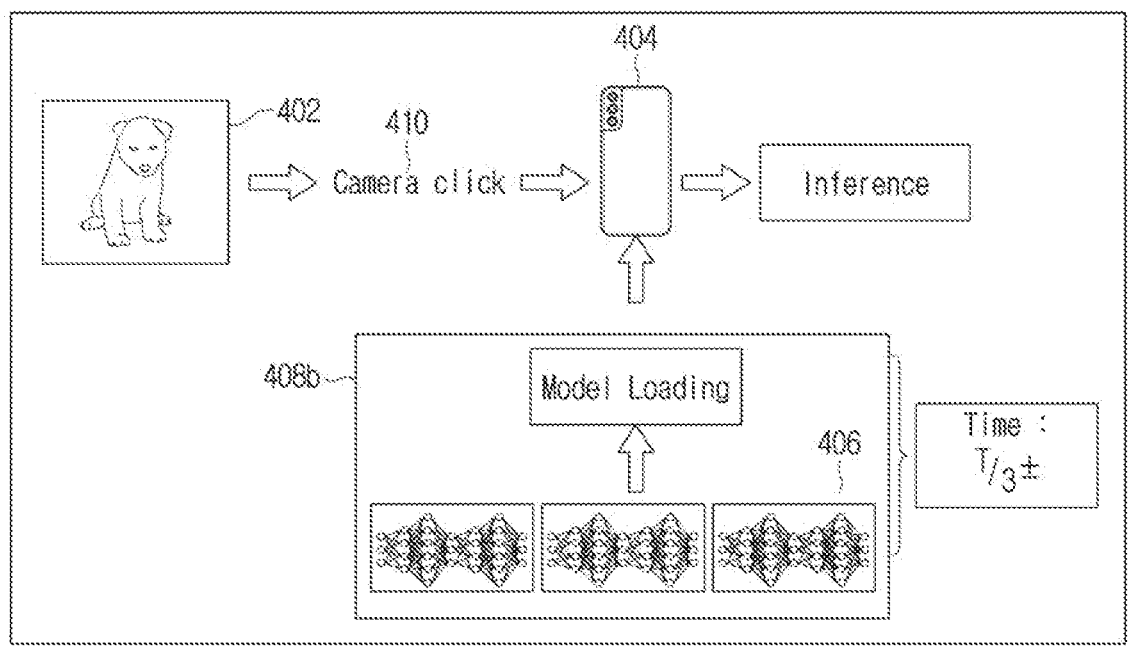
FIG. 7 is a schematic diagram illustrating an example scenario of loading a DNN by breaking into sub-models, according to an embodiment as disclosed herein.

FIG. 6 is a schematic diagram illustrating an example scenario of loading a DNN, according to a prior art. FIG. 7 is a schematic diagram illustrating an example scenario of loading a DNN by breaking into sub-models, according to an embodiment as disclosed herein.

As seen in FIG. 6 the example scenario explains loading time of a camera after clicking. In FIG. 6, (402) is the input image, (404) is the camera, (406) is the DNN model for loading of the camera (404), and block (408a) indicates the loading time. Now as seen in FIG. 6 at (410), the camera (404) is clicked to capture the input image (402). For a conventional method, once the image is clicked the full DNN model is loaded as seen in (408a), which consumes a lot of time and also execution of the full DNN model at one go takes time. Thus the claimed method and system modularizes the DNN model for camera loading and reduces the latency.

As seen in FIG. 7 the example scenario explains loading time of a camera after clicking. In FIG. 6, (402) is the input image, (404) is the camera, (406) is the DNN model for loading of the camera (404), and block (408b) indicates the loading time. Now as seen in FIG. 7 at (410), the camera (404) is clicked to capture the input image (402). The claimed method splits the DNN model into plurality of sub-models. In the current example embodiment, the DNN model is split into three sub-models. These sub-models are then loaded in parallel on the available hardware threads as seen in block (408b). The sub-models are executed in parallel. The parallel loading of the plurality of sub-models consumes less time than loading of the complete DNN model.

Figure 8:
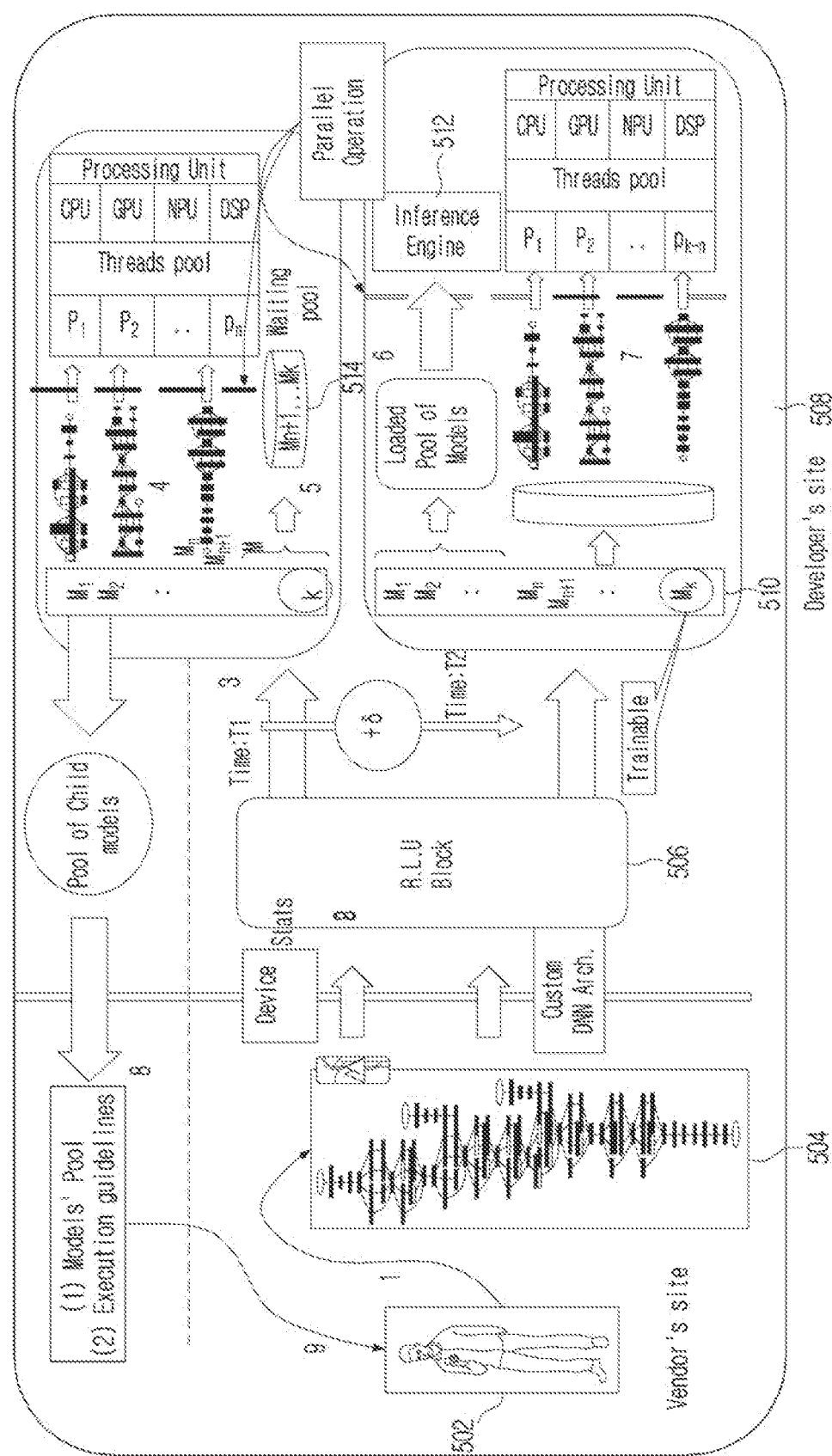
FIG. 8 is a schematic diagram illustrating a flow of a method for modularization of a DNN model for optimal loading, according to an embodiment as disclosed herein.

FIG. 8 is a schematic diagram illustrating a flow of a method for modularization of a DNN model for optimal loading, according to an embodiment as disclosed herein.

As seen in FIG. 8 (502) is the vendor, (504) is the DNN model, (506) is the RLU (140), (508) illustrates the operation of the electronic device (100) (developer's device), and (510) indicates the plurality of sub-models M1-Mk and (512) is the inference engine. At 1, the vendor (504) that is using the electronic device (100) sends the DNN model (504) to the electronic device (100). At 2 the RLU (140) receives the DNN model (504) and the plurality of parameters associated with the DNN model and the electronic device (100) (vendor's device). At 3, the RLU (140) splits the DNN model (504) into the plurality of sub-models (510) M1-Mn+1. In the example embodiment, the plurality of sub-models (510) M1-Mn+1 is more than the hardware threads available P1-Pn, and hence at 4 that is time instant T1, the first set of the plurality of sub-models is loaded on the memory through the hardware threads P1-Pn as seen in the FIG. 8. Further simultaneously at 5 the remaining sub-models are added in the waiting list (514). The point 4 and 5 are performed simultaneously. Once the first set of the sub-models (510) is loaded and the remaining sub-models are added to the waiting list (514) at time T1, then at time T2 points 6 and 7 are performed simultaneously. At point 6, the first set of sub-model that were loaded at time T1, are executed by passing them to the inference engine (512), and at 7, the remaining sub-models that were added to the waiting list (514) are loaded. This parallel operations of points 6 and 7 reduces the time in loading and executing the plurality of sub-models and also ensures efficient utilization of the hardware units. These sub-models M1-Mn+1 are sent to the vendor's device for execution of the application for which the DNN model was used.

In an embodiment, a sub-model from the plurality of sub-models (510) M1-Mn+1 for example a sub-model Mk is a trainable model. The sub-model Mk is capable to be fine-tuned to implement device personalization via on-device learning framework for example application of new class addition in gallery arrives with the occurrence of new event and corresponding photos.

Figure 9:
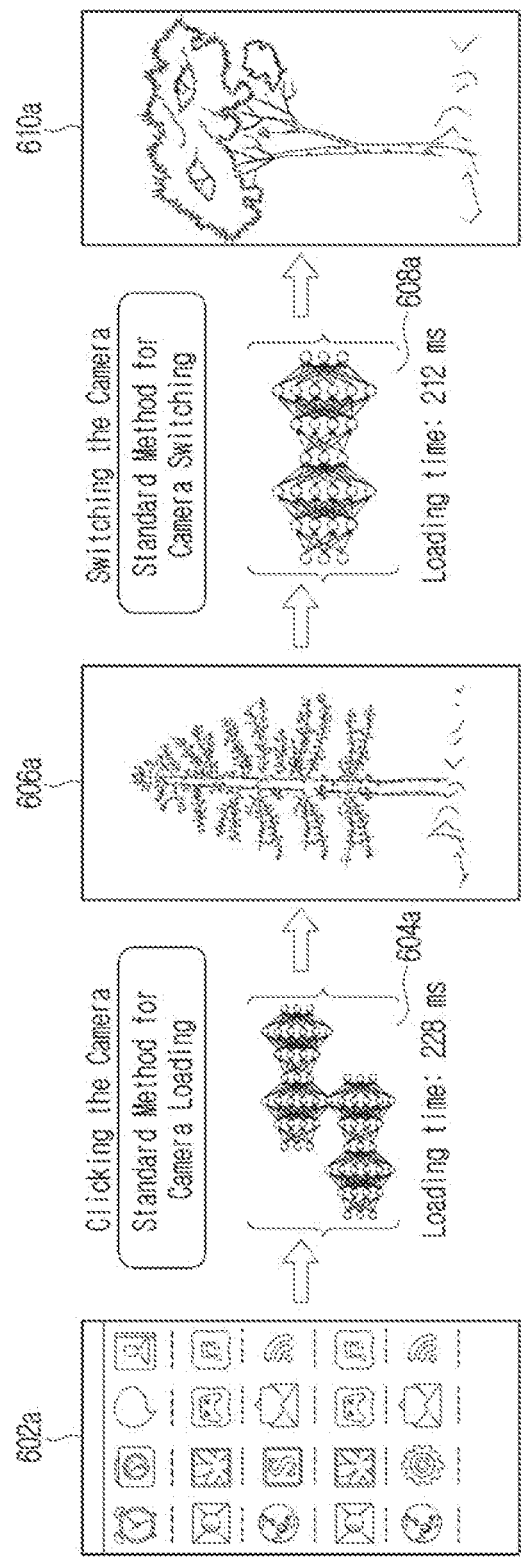
FIG. 9 is a schematic diagram illustrating an example embodiment of loading a camera, according to a prior art.

FIG. 9 is a schematic diagram illustrating an example embodiment of loading a camera, according to the prior art.

As seen in FIG. 9 the User Interface of an electronic device (602a) before the camera application is clicked. Here for camera operation the DNN model (604a) as shown in FIG. 9 is loaded. The loading time for opening of the camera is the loading time of the DNN model (604a). In the example embodiment the prior art device camera takes 228 ms, which means to come to (606a) after clicking the camera application shown in (602a) the time taken is 228 ms. Further, the camera is switched and a DNN model (608a) is again loaded for switching the camera that takes about 212 ms, indicating that to switch camera from (606a) to (610a) it takes 212 ms according to prior art.

The above mentioned time for opening and switching of the camera is more, and there is a substantial delay. Further, because the time is more, the hardware units such as the memory, the processor and the battery are over utilized that further causes improper working of other application on the electronic device due to non-availability of the hardware units. These technical problems are addressed by the method and system claimed herein.

Figure 10:
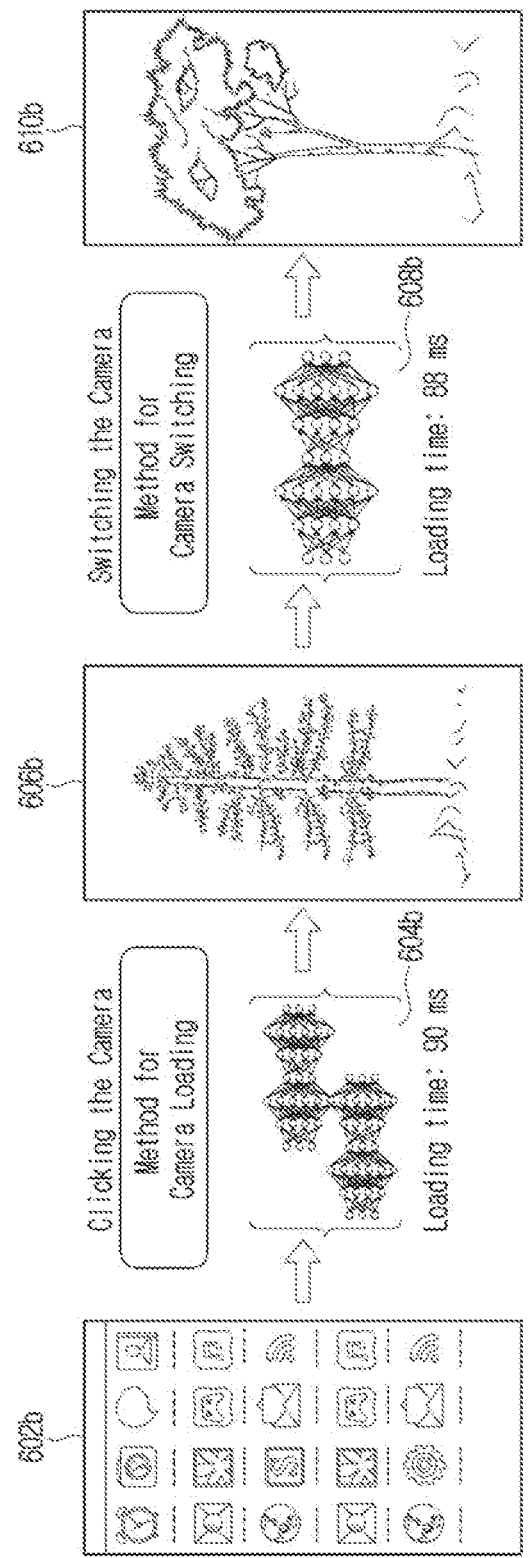
FIG. 10 is a schematic diagram illustrating an example embodiment of loading a camera, according to an embodiment as disclosed herein.

FIG. 10 is a schematic diagram illustrating an example embodiment of time of loading a camera, according to an embodiment disclosed herein.

As seen in FIG. 10 the User Interface of an electronic device (602b) before the camera application is clicked. Here for camera operation the DNN model (604b) as shown in FIG. 10 is split into a plurality of sub-models and the plurality of sub-models are loaded in parallel. The loading time for opening of the camera is the loading time for loading the plurality of sub-models (604b) in parallel that is 90 ms. This indicates that to come to (606b) after clicking the camera application shown in (602b) the time taken is 90 ms. Further, the camera is switched and a DNN model (610b) for camera switching is split into plurality of sub-models, and these sub-models are loaded and takes about 88 ms, indicating that to switch camera from (606b) to (610b) it takes 88 ms according to the claimed method and system.

Thus as discussed above the time for loading the plurality of sub-models is considerably less than the time for loading of the DNN model as a whole. Thus by splitting the DNN model into the plurality of sub-models, not only the latency is reduced but also the hardware units are efficiently utilized as discussed above.

The foregoing description of the embodiments will so fully reveal the nature of the embodiments herein that others can, by applying current knowledge, readily modify and/or adapt for various applications such embodiments without departing from the generic concept, and, therefore, such adaptations and modifications may and are intended to be comprehended within the meaning and range of equivalents of the disclosed embodiments. It is to be understood that the phraseology or terminology employed herein is for the purpose of description and not of limitation. Therefore, while the embodiments herein have been described in terms of examples, those skilled in the art will recognize that the embodiments herein can be practiced with modification within the spirit and scope of the embodiments as described herein.

The invention claimed is:

1. A method of deep neural network (DNN) modularization for optimal loading, the method comprising:
    receiving, by an electronic device, a DNN model for execution;
    obtaining, by the electronic device, a plurality of parameters associated with the electronic device and a plurality of parameters associated with the DNN model;
    determining, by the electronic device, a number of sub-models of the DNN model and a splitting index, based on the obtained plurality of parameters associated with the electronic device and the obtained plurality of parameters associated with the DNN model;
    splitting, by the electronic device, the received DNN model into a plurality of sub-models, based on the determined number of sub-models of the DNN model and the determined splitting index;
    determining, by the electronic device, a performance level of each of the plurality of sub-models into which the DNN model is split, by executing each of the plurality of sub-models on a testing device, wherein a capability of the testing device is same as a capability of the electronic device;
    determining, by the electronic device, whether the determined performance level of each of the plurality of sub-models meets a performance threshold;
    based on the performance level of at least one among the plurality of sub-models being determined to meet the performance threshold, selecting, by the electronic device, the at least one among the plurality of sub-models for execution;
    determining, by the electronic device, whether a number of hardware threads available at the electronic device is equal to the plurality of sub-models to be executed;
    based on the number of hardware threads being determined to be less than the plurality of sub-models to be executed, selecting, by the electronic device, a first set of sub-models, among the plurality of sub-models to be executed, corresponding to the number of hardware threads available; and
    adding, by the electronic device, remaining sub-models, among the plurality of sub-models to be executed, into a waiting list to be executed after the first set of sub-models.

2. The method as claimed in claim 1, wherein the number of sub-models is a number of the DNN model that is split, and
    wherein the splitting index indicates a sequence of the plurality of sub-models of the DNN model.

3. The method as claimed in claim 1, wherein the plurality of parameters associated with the electronic device comprises a number of tasks to be executed at the electronic device, a type of task to be executed at the electronic device, the number of hardware threads available at the electronic device for the DNN model, and a memory size of the electronic device.

4. The method as claimed in claim 1, wherein the determining the performance level of each of the plurality of sub-models comprises:
    deploying, by the electronic device, each of the plurality of sub-models on the testing device;
    determining, by the electronic device, a loading time of each of the plurality of sub-models deployed on the testing device; and determining, by the electronic device, the performance level of each of the plurality of sub-models, based on the determined loading time of each of the plurality of sub-models.

5. The method as claimed in claim 1, further comprising:
detecting, by the electronic device, at least one main task of an application that is executed in the electronic device;
identifying, by the electronic device, a plurality of sub-tasks to be executed to complete the detected at least one main task;
allocating, by the electronic device, the plurality of sub-models to be loaded for executing the identified plurality of sub-tasks; and
loading, by the electronic device, the allocated plurality of sub-models in parallel to executing the plurality of sub-tasks.

6. The method as claimed in claim 5, wherein the allocating the plurality of sub-models to be loaded for executing the identified plurality of sub-tasks comprises:
identifying, by the electronic device, the plurality of sub-models to be loaded for executing the identified plurality of sub-tasks, based on the application;
determining, by the electronic device, an order of execution of the plurality of sub-tasks and associated inter-dependencies, based on an instant execution state of the application; and
allocating, by the electronic device, the identified plurality of sub-models to be loaded for executing the plurality of sub-tasks, based on the determined order of execution and the determined associated inter-dependencies.

7. The method as claimed in claim 6, further comprising grouping, by the electronic device, one or more sub-models among the plurality of sub-models to be loaded for executing the plurality of sub-tasks, based on the determined order of execution and the determined associated inter-dependencies.

8. The method as claimed in claim 5, wherein the loading the allocated plurality of sub-models comprises:
determining, by the electronic device, whether the number of hardware threads available at the electronic device is equal to the allocated plurality of sub-models to be loaded for executing the plurality of sub-tasks;
based on the number of hardware threads being determined to be less than the allocated plurality of sub-models to be loaded for executing the plurality of sub-tasks, selecting, by the electronic device, the first set of sub-models, among the allocated plurality of sub-models, for executing a first set of sub-tasks, among the plurality of sub-tasks to be executed;
allocating, by the electronic device, the selected first set of sub-models;
adding, by the electronic device, the remaining sub-models, among the plurality of sub-models, into the waiting list; and
loading, by the electronic device, the allocated first set of sub-models in parallel to executing the first set of sub-tasks.

9. The method as claimed in claim 8, further comprising:
executing, by the electronic device, the first set of sub-tasks in parallel to the loading the allocated first set of sub-models;
allocating, by the electronic device, the remaining sub-models to be loaded for executing a remaining set of sub-tasks, among the plurality of sub-tasks, from the waiting list, while the first set of sub-tasks are being executed;
loading, by the electronic device, the allocated remaining sub-models in parallel to executing the remaining set of sub-tasks, while the first set of sub-tasks are being executed; and
executing, by the electronic device, the remaining sub-tasks in parallel to the loading the allocated remaining sub-models.

10. An electronic device for Deep Neural Network (DNN) modularization for optimal loading, the electronic device in communication with a testing device, the electronic device comprising:
a memory storing instructions;
a processor; and
a communication interface;
wherein the processor is configured to execute the stored instructions to:
receive a DNN model for execution;
obtain a plurality of parameters associated with the electronic device and a plurality of parameters associated with the DNN model;
determine a number of sub-models of the DNN model and a splitting index, based on the obtained plurality of parameters associated with the electronic device and the obtained plurality of parameters associated with the DNN model;
split the received DNN model into a plurality of sub-models, based on the determined number of sub-models of the DNN model and the determined splitting index;
determine a performance level of each of the plurality of sub-models into which the DNN model is split, by executing each of the plurality of sub-models on the testing device, wherein a capability of the testing device is same as a capability of the electronic device;
determine whether the determined performance level of each of the plurality of sub-models meets a performance threshold;
based on the performance level of at least one among the plurality of sub-models being determined to meet the performance threshold, select the at least one among the plurality of sub-models for execution;
determine whether a number of hardware threads available at the electronic device is equal to the plurality of sub-models to be executed;
based on the number of hardware threads being determined to be less than the plurality of sub-models to be executed, select a first set of sub-models, among the plurality of sub-models to be executed, corresponding to the number of hardware threads available; and
add remaining sub-models, among the plurality of sub-models to be executed, into a waiting list to be executed after the first set of sub-models.

11. The electronic device as claimed in claim 10, wherein the number of sub-models is a number of the DNN model that is split, and
wherein the splitting index indicates a sequence of the plurality of sub-models of the DNN model.

12. The electronic device as claimed in claim 10, wherein the plurality of parameters associated with the electronic device comprises a number of tasks to be executed at the electronic device, a type of task to be executed at the electronic device, the number of hardware threads available at the electronic device for the DNN model, and a memory size of the electronic device.

13. The electronic device as claimed in claim 10, wherein the processor is further configured to execute the stored instructions to:
- deploy each of the plurality of sub-models on the testing device;
- determine a loading time of each of the plurality of sub-models deployed on the testing device; and
- determine the performance level of each of the plurality of sub-models, based on the determined loading time of each of the plurality of sub-models.

14. The electronic device as claimed in claim 10, wherein the processor is further configured to execute the stored instructions to:
- detect at least one main task of an application that is executed in the electronic device;
- identify a plurality of sub-tasks to be executed to complete the detected at least one main task;
- allocate the plurality of sub-models to be loaded for executing the identified plurality of sub-tasks; and
- load the allocated plurality of sub-models in parallel to executing the plurality of sub-tasks.

15. A method of loading an artificial intelligence (AI) driven neural model in an electronic device, the method comprising:
- identifying, by the electronic device, at least one main task of an application that is executed on the electronic device;
- identifying, by the electronic device, a plurality of individual sub-tasks to be executed for completing the identified at least one main task;
- identifying, by the electronic device, a parent AI model to be deployed for performing the identified at least one main task;
- identifying, by the electronic device, a plurality of child AI models to be deployed for performing the identified plurality of individual sub-tasks;
- determining, by the electronic device, using a pre-trained AI model, one or more of the identified plurality of child AI models to be executed in parallel for completing the identified plurality of individual sub-tasks; and
- loading, by the electronic device, the determined one or more of the plurality of child AI models in parallel to execution of the identified at least one main task.

16. The method as claimed in claim 1, further comprising:
- determining, by the electronic device, an order of execution of a plurality of sub-tasks, based on an instant execution state of an application; and
- allocating, by the electronic device, the identified plurality of sub-models to be loaded for executing the plurality of sub-tasks, based on the determined order of execution.

17. The electronic device as claimed in claim 10, wherein the processor is further configured to execute the stored instructions to:
- determine an order of execution of a plurality of sub-tasks, based on an instant execution state of an application; and
- allocate the identified plurality of sub-models to be loaded for executing the plurality of sub-tasks, based on the determined order of execution.

* * * * *